United States Patent [19]
Galen

[11] 3,734,272
[45] May 22, 1973

[54] PROTECTIVE ENCLOSURE FOR BICYCLE

[76] Inventor: Ralph W. Galen, 26 Marrett Road, Lexington, Mass. 02173

[22] Filed: June 30, 1971

[21] Appl. No.: 158,445

[52] U.S. Cl..................206/1 R, 206/46 H, 217/37
[51] Int. Cl..........................B65d 85/00, B65d 85/68
[58] Field of Search..................206/1 R, 46 R, 46 M, 206/46 H, 62 R; 217/37, 38, 53

[56] References Cited

UNITED STATES PATENTS

| 542,096 | 7/1895 | Mumford | 217/37 |
| 2,299,355 | 10/1942 | Stolpman | 217/37 |
| 588,050 | 8/1897 | Benton | 217/37 |
| 2,950,001 | 8/1960 | Bucko | 217/53 |

Primary Examiner—William T. Dixson, Jr.
Attorney—Robert J. Schiller et al.

[57] ABSTRACT

An enclosure suitable for use as a storage locker or shipping container for a bicycle includes a container having a door at one end; a channel on its bottom wall for guiding the wheels of a bicycle as it is rolled into the container; wheel-engaging channels on the door and other end wall for supporting the bicycle in an upright position and a retaining device mounted for vertical movement on the side walls for engaging the frame to restrain it against lateral motion. The position of the restraining device is adjustable from the exterior of the container by locking knobs located in recesses in the side walls so as not to project beyond the surfaces thereof.

13 Claims, 8 Drawing Figures

Patented May 22, 1973 3,734,272

RALPH W. GALEN
INVENTOR.

BY Schiller & Pandiscio
ATTORNEYS.

PROTECTIVE ENCLOSURE FOR BICYCLE

BACKGROUND OF THE INVENTION

The current increase in use and popularity of the bicycle for recreation and transportation has also resulted in an increase in bicycle thefts and/or malicious damage to bicycles and parts thereof. Bicycle owners have been forced to resort to carrying heavy chains for locking as many components of a bicycle as possible to a fixed object in order to prevent theft. However, such measures have proved substantially less than satisfactory because they do not provide complete protection from theft of the bicycle—chains can be cut—, from theft of parts or damage due to maliciousness, accident or natural causes such as weather. Clearly, improved means for protectively storing a bicycle out of doors is needed. Another need originating in the increased popularity of bicycling is for a container for shipping bicycles in assembled condition. Such a container will find utility with the owner who wishes to take his bicycle with him, for example when he goes on a vacation, and finds it necessary to ship his bicycle by way of a common carrier which usually requires that the bicycle be protectively crated.

SUMMARY OF THE INVENTION

An object of the present invention is to provide a novel and improved protective enclosure for bicycles adapted to be employed both as a locker providing convenient and safe temporary outdoor storage and as a shipping container in which a fully assembled bicycle is protected from damage.

Another object of the invention is to provide a bicycle storage container of the type described which is light, inexpensive, easy to handle, designed to accept a variety of sizes and styles of bicycles and facilitates the ready introduction and withdrawal of the bicycle with a minimum of inconvenience and effort.

These and other objects of the invention are achieved by providing a container having a door that can be locked, removable wheels to facilitate movement of the container, guides to facilitate the introduction and withdrawal of a bicycle, supports for holding the bicycle in an upright position and externally adjustable retaining means for securely holding the bicycle in a fixed position so as to permit rough handling of the container, as in shipping, without damage to the bicycle. The container is sturdy and not easily damaged and has no projections to become damaged or damage other objects being shipped.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
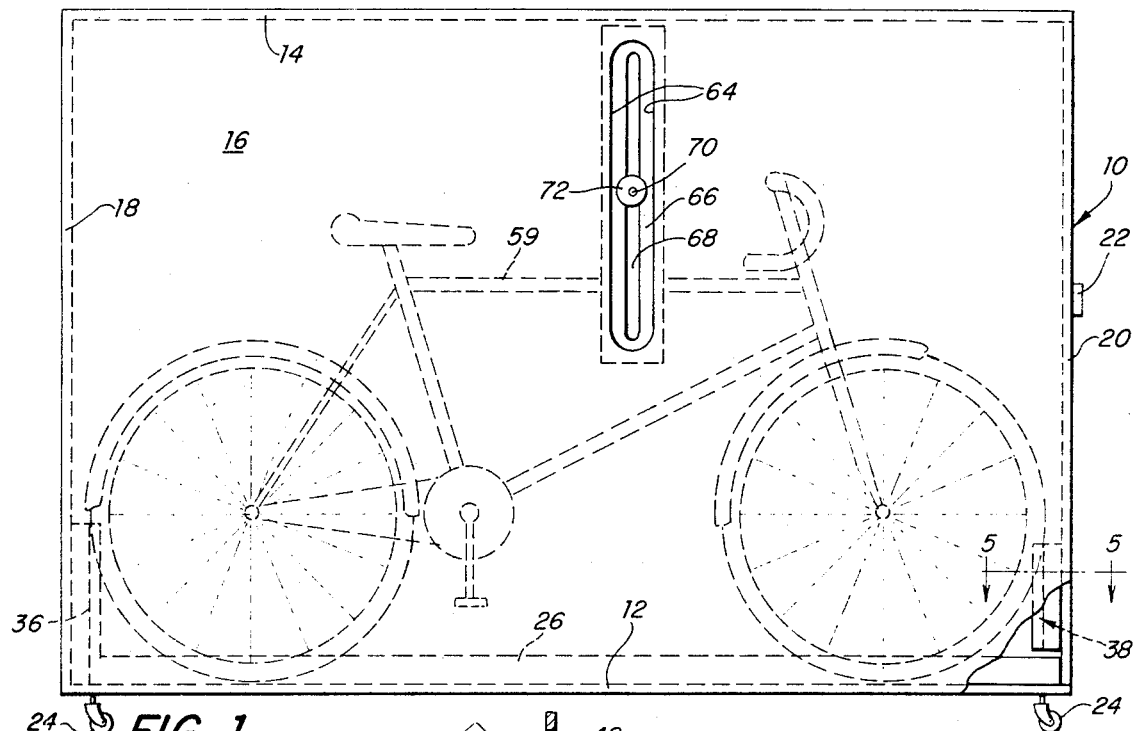
FIG. 1 is a side, elevational view of a bicycle storage container embodying the present invention shown with a bicycle contained therein.
Figure 2:
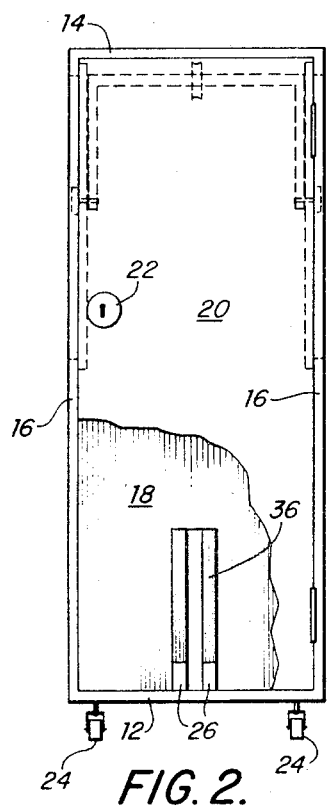
FIG. 2 is an end elevational view, partly broken away, of the storage container of FIG. 1.

Reference is now made to FIGS. 1 and 2 of the drawings wherein there is illustrated a protective enclosure embodying the invention. The enclosure comprises a generally parallelipiped shaped container or locker 10 having a bottom wall or floor 12, an upper wall 14, side walls 16, an end wall 18 and a door 20 forming the other end wall. Although all the walls of container 10 are illustrated as being rectangular and planar, in applications in which the container is employed as an outdoor locker, upper wall 14 may be curved or sloped to prevent accumulation of rain or snow. Also for this application, door 20 may be biased into a closed position and is shown provided with a conventional lock 22. Alternatively, lock 22 may be of the type employed in rental lockers and will be of the coin operated type.

The container may be formed of a variety of strong, durable and/or lightweight materials such as wood, metal and plastics, particularly of the glass reinforced type, depending upon the primary function intended to be performed. Provision may also be made for attaching a plurality of lockers 10 in side by side relation, in which case adjacent lockers may share a common dividing wall and common bottom, end and upper walls. Provision can be made for mounting conventional, removable castered wheels 24 on bottom wall 12 to facilitate movement of container 10. Container 10 is designed to facilitate and permit a bicycle to be rolled, in an upright position, backwards into the container through the doorway at one end. Thus, the spacing between side walls 16 should be sufficient to admit the full width of the handlebars of the bicycle.

Guide means are provided within the container for holding the wheels in alignment and locating them midway between the side walls as the bicycle is rolled into the container. In the form shown in FIGS. 1 and 2, these guide means include a pair of guide members 26 mounted in spaced, parallel relation on bottom wall 12 and cooperating to define a channel extending from end to end of the container for receiving the wheels and/or tires of a bicycle. Guide members 26 have vertical facing walls which may be spaced to accommodate the widest type of bicycle tire or, if desired, to accept only the narrower type of tire and thereby eliminate lateral motion, a desirable feature if the container is to be used for shipping purposes.

Figures 5, 6, 7:
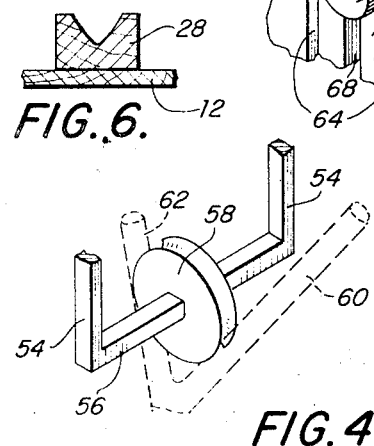
FIG. 5 is a fragmentary, sectional view taken substantially along line 5—5 of FIG. 1.

Alternative guide constructions are shown in FIGS. 6 and 7 designed to accept either type of tire (or wheel) and prevent lateral motion thereof. FIG. 6 shows a guide member 28 formed with a V-shaped channel while the guide member 30 shown in FIG. 7 includes a channel having two U-shaped sections designated 32 and 34. Section 32 is narrower than section 34 and is designed to accept the smaller width tire while the larger or balloon type tire will be received and engaged against lateral motion by the wider section 34 of the channel.

Support means are provided in the container on end wall 18 and door 20 for engaging the tires and/or wheels and holding the bicycle in an upright position. In the form shown in FIG. 1, 2 and 5, these support means include a vertical channel member (or members) 36 on end wall 18 aligned with the channel formed by guide members 26 for engaging the rear tire and/or wheel of a bicycle. A similar channel member (or members) 38 is provided on door 20 for engaging the front wheel of a bicycle when the door is closed. Channel members 36 and 38 may take the same form as the channel members previously described mounted on bottom wall 12, or they may be constructed as shown in FIG. 5. In this latter embodiment, member 38 is formed of two divergent side members 40 defining a channel with divergent walls and an insert 42, preferably formed of an elastomer for determining the depth of the channel as well as providing for more compliant and resilient support. The inner wall surfaces of the channels-both guide and support-may be coated with a protective coating designed to prevent wear on the bicycle tires and/or wheels. The channel members and or sections of the bottom wall 12, end wall 18 and door 20 may be constructed so as to be readily removable to permit substitution of the channels having the width and/or depth appropriate for a particular bicycle, in order to restrain the bicycle against motion.

Figures 3, 4, 8:
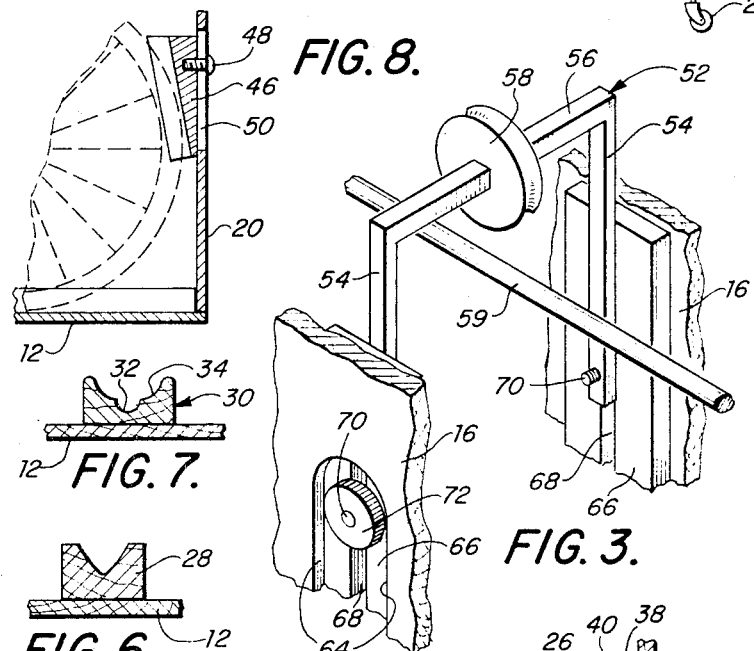
FIG. 3 is a fragmentary perspective view of means for retaining a bicycle in fixed position within the protective container illustrating the operation thereof.
FIG. 4 is another fragmentary perspective view illustrating the operation of the bicycle retaining means of FIG. 3.
FIGS. 6, 7 and 8 are sectional views showing alternative embodiments of components of the invention.

An alternative form of support means adjustable to fit bicycles of varying length, is illustrated in FIG. 8. These support means include a channel member 46 in the form of a wedge mounted for vertical movement on either or both door 20 and wall 18. The wedge-shaped channel member 46 (or members) may be moved upwardly to accommodate a longer bicycle or downwardly to engage the wheel of a shorter bicycle. A convenient adjustable mounting includes a screw or screws 48 threaded into the channel member and extending through a vertical slot 50 in the door or end wall.

The container or locker 10 shown in the drawings includes retaining means designed to restrain the bicycle against lateral motion and at least to some extent, against vertical motion as well. This construction is particularly desirable when the container is to be moved or subjected to shocks as in shipping. The retaining means comprise a generally U-shaped clamp or retainer 52 shown in detail in FIG. 3 having a pair of side arm members 54 joined by a transverse connecting member 56. A disc or wheel 58 having a periphery formed with a channel is mounted on transverse member 56 for engaging the top tube 59 of the frame of a boy's bicycle. Disc 58 is preferably nonrotatable and is formed of a compliant material such as an elastomer which will not scratch or mar the top tube and has a high coefficient of friction tending to prevent motion of the disc along the top tube. The reason for using a circular disc 56 will be apparent from FIG. 4 wherein there is illustrated a portion of the frame of a woman's bicycle (in which the top tube 59 is omitted), the frame including a diagonal tube 60 which joins an upright (or inclined) tube 62 above the hub which houses the peddles assembly. In this case, disc 58 engages both tubes 60 and 62 near their intersection.

Retainer 52 is mounted for at least vertical motion on side walls 16. For this purpose, each of the side walls is formed with a relatively wide vertical slot 64 adapted to cooperate with an inner panel 66 secured to the inside of the side wall across the channel. Panels 66 are each formed with a relatively narrow vertical slot 68 adapted to slidably receive a bolt or screw 70 engaged in a tapped hole in a side arm member 54. Each screw 70 has a manually engageable locking knob 72 on its outer end for turning the screw to clamp panel 66 between side member 54 and the knob and thereby prevent vertical motion of retainer 52. This construction permits both vertical adjustment of the position of the retainer 52 as well as rotation through 180° to either of the positions shown in FIGS. 3 or 4, to accommodate either a man's or woman's bicycle. The depth of the channel formed by slot 64 and panel 66 is at least equal to the axial dimension of knob 72 so that the knob does not project beyond the outer surface of the side wall.

It will be apparent that other constructions are possible depending upon the material and method of fabrication of the container. For example, if the container is formed of metal or reinforced plastic, the channels for receiving knobs 72 may be formed as integral indented sections of the side walls 16. As an additional feature, pivotal or rotary motion of retainer 52 about screws 70 may be prevented by providing a third screw 70 and knob 72 in one of side members 54. This third screw can be removed completely to permit rotation of the frame and then tightened to prevent frame rotation as well as to provide an additional force restraining the frame against vertical motion. It also is contemplated to make slots 68 wide enough to accommodate the arm members 54 so that the arm members can slide in the slots 68 but cannot rotate, in which case rotation of retainer 52 from the position of FIG. 3 to that of FIG. 4 is possible by removing screws 70, lowering the retainer out of the bottom ends of slots 68, inverting the retainer and sliding it back into the grooves for reconnection of locking screws 70. Another alternate approach is to provide serrations on the adjacent surfaces of arm members 54 and panel 66 so that the retainer 54 can be locked by screws 70 in an inclined position. This alternative approach is advantageous in storing a girls bicycle where because of its particular size the intersection of the tubes 60 and 62 of the simple frame may not be located immediately below the slots 68.

It will be seen from the foregoing that the objects of providing a protective enclosure useful both as a storage locker and a shipping container for bicycles have been achieved in a relatively simple and inexpensive construction. This construction includes a container with associated guide supports and restraining means for securely holding a bicycle in place. A bicycle stored in the container is safe from theft or vandalism and is supported in such a manner that it can be handled and shipped without damage. The construction disclosed readily lends itself to a variety of uses and applications including a fixed or movable locker, a rental locker and a shipping container.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A protective enclosure for bicycles comprising in combination:
   a container having upper, lower, side and end walls defining a compartment for enclosing a bicycle;

at least a portion of one of said end walls comprising a door for admitting a bicycle;

support means mounted on at least one of said end walls for engaging the tires of a bicycle to support it in an upright position;

guide means mounted on said lower wall of said container for guiding a bicycle into engagement with said support means, said guide means providing a channel aligned with said support means and extending lengthwise of said lower wall for engaging the tires of a bicycle and guiding said bicycle into said compartment; and retaining means moveable downwardly into engagement with the frame of a bicycle so as to hold the latter against lateral movement, said retaining means including means accessible from the exterior of said container for moving said retaining means into and out of engagement with the frame of a bicycle mounted in said compartment.

2. A protective enclosure for bicycles comprising in combination:

a container having upper, lower, side and end walls defining a compartment for enclosing a bicycle;

at least a portion of one of said walls comprising a door for admitting a bicycle;

support means mounted on at least one of said end walls for engaging at least one of the tires of a bicycle to support it in an upright position;

guide means mounted on said lower wall of said container for guiding a bicycle into engagement with said support means, said guide means providing a channel aligned with said support means and extending lengthwise of said lower wall for engaging at least one of the tires of a bicycle and guiding said bicycle into said compartment; and retaining means moveable downwardly into engagement with the frame of a bicycle so as to hold the latter against lateral movement, said retaining means including means accessible from the exterior of said container for moving said retaining means into and out of engagement with the frame of a bicycle mounted in said compartment.

3. A protective enclosure for bicycles as defined in claim 2 wherein said retaining means are movable vertically and include locking means accessible from the exterior of said container for releasably securing said retaining means against vertical motion with a bicycle frame.

4. A protective enclosure for bicycles as defined in claim 2 wherein said retaining means include a generally U-shaped support including side members mounted for vertical motion on said side walls, a cross member including a channel member for engaging a tube of a bicycle frame and adjustment members extending through openings in said side walls to permit adjustment of the position of said retaining means.

5. A protective enclosure for bicycles as defined in claim 4 wherein said retaining means further include locking means coupled with said adjustment members exterior of said container and operable manually to secure said retaining means against vertical movement.

6. A protective enclosure for bicycles as defined in claim 5 wherein each of said side walls is formed with a recess and said locking means are disposed completely within said recesses so as not to project beyond the outer surfaces of said side walls.

7. A protective enclosure for bicycles as defined in claim 5 wherein said locking means include a pair of threaded members each engaged in a tapped hole in one of said side members and extending through a generally vertical slot in one of said side walls, and each of said threaded members having a engageable knob secured to its external end.

8. A protective enclosure for bicycles as defined in claim 7 wherein each of said side walls includes a recess surrounding said slot therein having a width dimension exceeding the diameter of said knobs and a depth dimension at least equal to the axial dimension of said knobs.

9. A protective enclosure for bicycles as defined in claim 4 wherein said channel member is in the form of a disk formed with a channel in its periphery.

10. A protective enclosure for bicycles as defined in claim 1 wherein said channel provided by said guide means is V-shaped.

11. A protective enclosure for bicycles as defined in claim 1 wherein said support means includes a channel for receiving a bicycle tire.

12. A protective enclosure for bicycles as defined in claim 1 wherein said support means includes side members and a resilient cushion mounted between said side members.

13. A protective enclosure for bicycles as defined in claim 1 wherein the position of said support means is adjustable vertically.

* * * * *